Easterbrook & Wood,
Osier Peeler.
No. 1,337. Reissued Sep. 2, 1862.
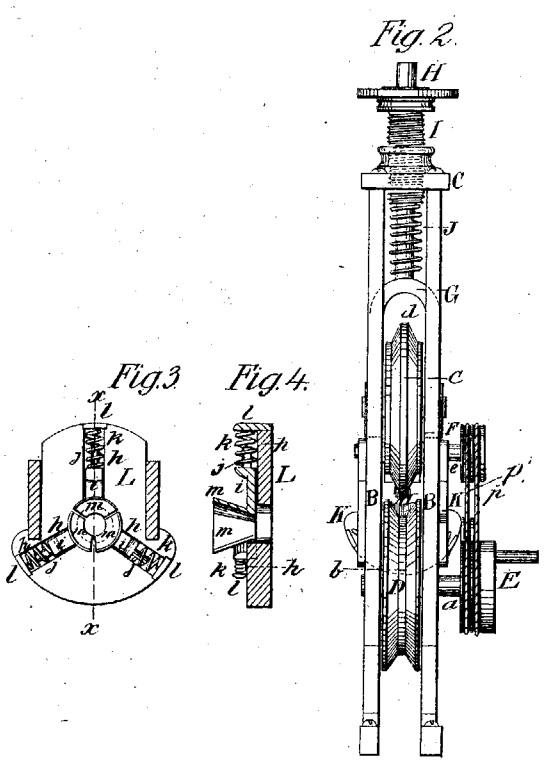
Witnesses
J. W. Coombs
G. V. Reed
Inventor
M. Easterbrook
J. No. Wood
Per Munn & Co
Attorneys
AM. PHOTO-LITHO. CO. N.Y. (OSBORNE'S PROCESS)

UNITED STATES PATENT OFFICE.

M. EASTERBROOK, J. M. WOOD, AND E. A. BRONSON, OF GENEVA, NEW YORK, ASSIGNEES OF SAID EASTERBROOK AND WOOD.

IMPROVEMENT IN MACHINES FOR PEELING WILLOWS.

Specification forming part of Letters Patent No. 34,201, dated January 21, 1862; Reissue No. 1,337, dated September 2, 1862.

*To all whom it may concern :*

Be it known that we, M. EASTERBROOK and J. M. WOOD, both of Geneva, in the county of Ontario and State of New York, have invented a new and useful Machine for Peeling Willows; and we do hereby declare that the following is a full, clear, and exact description thereof, reference being had to the annexed drawings, making a part of this specification, in which—

Figure 1 is a side elevation of our invention. Fig. 2 is a front elevation of the same. Fig. 3 is a detached face view of a stripping plate pertaining to the same. Fig. 4 is a section of Fig. 3 taken in the line *x x*.

Similar letters of reference indicate corresponding parts in the several figures, and the arrows indicate the direction in which the wheels, rollers, and brushes revolve.

This invention consists in the employment or use in willow-peeling machines of two presser-wheels, one having a V-shaped circumferential groove and the other having a raised periphery of corresponding shape, except that the very edge or apex is cut away and is made slightly concave, and as the willow is passed through between the wheels it receives a central pressure on three sides, which effectually and entirely loosens the bark and prepares it for stripping, and in the peculiar construction and arrangement of a stripping device, which operates in combination with the presser-wheels, brushes, and the discharge-rollers, and also in the combination of the press-wheels, radially-adjusting scrapers, circular rotary brushes, and two discharging-rollers.

To enable others skilled in the art to make and use our invention, we will proceed to describe its construction and operation.

A represents a base or bed piece, which has two upright plates, B, attached to it, the upper ends of which are connected by a cross-plate, C. Between the uprights B, near their lower ends, there is a wheel, D, the shaft *a* of which passes through the upright and has a crank-pulley, E, at one end. There is a V-shaped groove, *b*, made in the periphery of wheel D, as seen in Fig. 2. The upper presser-wheel, F, which is of corresponding diameter with wheel D, has a projecting V-shaped periphery, *c*, the edge or apex of which is cut away, forming a very narrow face, which is made slightly concave, as seen at *d*, Fig. 2, and its shaft *e* rests in bearings *f* at the lower end of a yoke, G, which is allowed to slide freely in slots *g* in the uprights B. The yoke G has a vertical rod, H, at its upper end, and this rod passes loosely through a screw, I, which is fitted in the plate C. The lower end of the screw I bears upon a spiral spring, J, which surrounds the rod H, and thus allows the wheel F to adjust itself to the continually-varying size of the passing willow. To each upright B there is attached a horizontal bar, K, about in line with the "bite" of the wheels D and F. Between the said bars K there is fitted a plate, L, which has three radial grooves, *h*, made in its face side, as shown in Fig. 3. In each groove *h* there is placed a slide, *i*, having a rod, *j*, at its outer end encircled by a spiral spring, *k*, which renders the slide *i* self-adjusting to the varying size of the willows or to irregularities of their surface. The springs *k* bear against the lips *l* at the edge of the plate L. The inner edge of each slide *i* is provided with an oblique or inclined projection, *m*, which together form a funnel-shaped tube, as seen in Figs. 3 and 4. There are two circular rotary brushes, M, their shafts *n* having bearings in the projections *o* of the bars K. These brushes work nearly or quite in contact with each other, and they are rotated by belts *p* and *p'* from the crank-pulley E.

There are two discharging-rollers, N, placed one above the other, and having the bearings of their shafts *q* in the projections *r* of the bars K. These rollers are of india-rubber or other suitable material, and are driven by a belt, *s*, from the shaft *n* of the upper brush, M.

It will be seen that when the willow, which is cylindrical, lies in the V-shaped groove *b*, between the two wheels, there will only be a pressure or bearing upon three points, the degree of pressure being adjusted to the greatest nicety by turning the screw I up or down to increase or diminish it, and the bark, being soft, yields to the pressure, which tends to enlarge its circumference, and therefore those portions between the bearings are forced outward, which effectually loosens the bark from the wood as the willow moves forward without crushing or otherwise injuring the willow.

Operation: The crank-pulley E is rotated by any convenient power, and the willow to be peeled is passed between the wheels D and F. The pressure from these wheels, owing to the form of their peripheries, as described, loosens the bark, and as the willow passes through the funnel-formed scrapers *m* the loosened bark is readily separated from the wood, and is discharged from the large end of the funnel, while the willow passes through between the brushes M, which revolve in the opposite direction and entirely remove any of the shreds or fibers of bark that might by any possibility escape the action of the scrapers *m*, the willow being drawn through the scrapers and between the brushes and discharged by the rollers N.

What we claim, and desire to secure by a reissue of our Letters Patent, is—

1. The employment or use, in willow-peeling machines of two presser-wheels, D and F, constructed and operating substantially as described, so as to produce a direct central pressure upon three sides of the passing willow.

2. The projections *m*, attached to yielding slides *i*, which are fitted in a plate, L, between the bars K, and arranged in relation with the wheels D and F, to operate as and for the purpose specified.

3. The combination of the presser-wheels D and F, yielding scrapers *m*, revolving brushes M, and the discharging-rollers N, arranged as and for the purposes specified.

MATTHEW EASTERBROOK.
J. M. WOOD.

Witnesses:
GEO. B. DUSNIBERRE,
VICTOR H. ECHORN.